(12) United States Patent
Pervan

(10) Patent No.: US 11,885,355 B2
(45) Date of Patent: Jan. 30, 2024

(54) MECHANICAL LOCKING SYSTEM FOR BUILDING PANELS

(71) Applicant: Välinge Innovation AB, Viken (SE)

(72) Inventor: Darko Pervan, Viken (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

(21) Appl. No.: 17/717,359

(22) Filed: Apr. 11, 2022

(65) Prior Publication Data

US 2022/0299057 A1    Sep. 22, 2022

Related U.S. Application Data

(63) Continuation of application No. 16/946,047, filed on Jun. 4, 2020, now Pat. No. 11,326,636, which is a (Continued)

(30) Foreign Application Priority Data

May 9, 2014    (SE) .................................. 1400231-5

(51) Int. Cl.
*F16B 12/12*    (2006.01)
*F16B 12/46*    (2006.01)
(Continued)

(52) U.S. Cl.
CPC .......... *F16B 12/125* (2013.01); *A47B 13/021* (2013.01); *A47B 47/0075* (2013.01); *A47B 47/025* (2013.01); *A47B 47/04* (2013.01); *A47B 47/042* (2013.01); *A47B 63/00* (2013.01); *A47B 77/00* (2013.01); *F16B 12/24* (2013.01);
(Continued)

(58) Field of Classification Search
CPC . A47B 47/006; A47B 47/0075; A47B 47/025; A47B 47/042; A47B 2088/902; A47B 2230/0081; F16B 5/0012; F16B 5/0016; F16B 5/0044; F16B 5/0052;
(Continued)

(56) References Cited

U.S. PATENT DOCUMENTS 291,032 A    1/1884   Cleland
634,581 A    10/1899  Miller
(Continued)

FOREIGN PATENT DOCUMENTS

AT    400 611 B    2/1996
CH    365 507 A    11/1962
(Continued)

OTHER PUBLICATIONS

U.S. Appl. No. 17/337,699, Johan Svensson, filed Jun. 3, 2021, (Cited herein as US Patent Application Publication No. 2021/0381251 A1 of Dec. 9, 2021).
(Continued)

*Primary Examiner* — Josh Skroupa
(74) *Attorney, Agent, or Firm* — Boone IP Law

(57) ABSTRACT

Panels with a mechanical locking system including a separate and flexible tongue allowing connection with a snap action are described herein. An outer edge part of the separate flexible tongue includes a guiding protrusion that facilitates disassembly of the panels and that is deformed during locking and/or unlocking.

18 Claims, 5 Drawing Sheets

Related U.S. Application Data continuation of application No. 15/308,872, filed as application No. PCT/SE2015/050518 on May 8, 2015, now Pat. No. 10,876,562.

(51) Int. Cl.

| | |
|---|---|
| *F16B 12/24* | (2006.01) |
| *A47B 47/04* | (2006.01) |
| *A47B 13/02* | (2006.01) |
| *A47B 47/00* | (2006.01) |
| *A47B 47/02* | (2006.01) |
| *A47B 63/00* | (2006.01) |
| *A47B 77/00* | (2006.01) |
| *A47B 88/90* | (2017.01) |

(52) U.S. Cl.
CPC ........ *F16B 12/46* (2013.01); *A47B 2088/902* (2017.01); *F16B 2012/466* (2013.01)

(58) Field of Classification Search
CPC ........ F16B 5/002; F16B 12/125; F16B 12/24; F16B 12/26; F16B 12/46; F16B 2012/466
See application file for complete search history.

(56) References Cited

U.S. PATENT DOCUMENTS

| | | | |
|---|---|---|---|
| 701,000 A | 5/1902 | Ahrens | |
| 861,911 A | 7/1907 | Stewart | |
| 881,673 A | 3/1908 | Ellison | |
| 1,533,099 A | 4/1925 | Carroll | |
| 1,534,468 A | 4/1925 | Shea, Jr. | |
| 1,800,386 A | 4/1931 | Hoffman | |
| 1,800,387 A | 4/1931 | Greist | |
| 1,802,245 A | 4/1931 | Foretich | |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 2,681,483 A | 6/1954 | Morawetz | |
| 3,002,630 A | 10/1961 | Heisser | |
| 3,195,968 A | 7/1965 | Freeman | |
| 3,284,152 A | 11/1966 | Schörghuber | |
| 3,313,054 A | 4/1967 | Madey | |
| 3,347,610 A | 10/1967 | Pilliod | |
| 3,410,441 A | 12/1968 | Rhyne | |
| 3,722,704 A | 3/1973 | Piretti | |
| 3,722,971 A | 3/1973 | Zeischegg | |
| 3,742,807 A | 7/1973 | Manning | |
| 3,765,465 A | 10/1973 | Gulistan | |
| 3,784,271 A | 1/1974 | Schreiber | |
| 3,884,002 A | 5/1975 | Logie | |
| 3,885,845 A | 5/1975 | Krieks | |
| 3,981,118 A | 9/1976 | Johnson et al. | |
| 4,089,614 A | 5/1978 | Harley | |
| 4,099,293 A | 7/1978 | Pittasch | |
| 4,099,887 A | 7/1978 | Mackenroth | |
| 4,116,510 A | 9/1978 | Franco | |
| 4,142,271 A | 3/1979 | Busse | |
| 4,211,379 A | 7/1980 | Morgan et al. | |
| 4,222,544 A | 9/1980 | Crowder | |
| 4,279,397 A | 7/1981 | Larsson | |
| 4,299,067 A | 11/1981 | Bertschi | |
| 4,308,961 A | 1/1982 | Kunce | |
| 4,324,517 A | 4/1982 | Dey | |
| 4,403,886 A | 9/1983 | Haeusler | |
| 4,405,253 A | 9/1983 | Stockum | |
| 4,509,648 A | 4/1985 | Govang | |
| 4,593,734 A | 6/1986 | Wallace | |
| 4,595,105 A | 6/1986 | Gold | |
| 4,597,122 A | 7/1986 | Handler | |
| 4,615,448 A | 10/1986 | Johnstonbaugh | |
| 4,629,076 A | 12/1986 | Amstutz et al. | |
| 4,750,794 A | 6/1988 | Vegh | |
| 4,752,150 A | 6/1988 | Salice | |
| 4,815,908 A | 3/1989 | Duran et al. | |
| 4,817,900 A | 4/1989 | Whittington et al. | |
| 4,844,266 A | 7/1989 | Small et al. | |
| 4,883,331 A | 11/1989 | Mengel | |
| 4,886,326 A | 12/1989 | Kuzyk | |
| 4,888,933 A | 12/1989 | Guomundsson | |
| 4,891,897 A | 1/1990 | Gieske et al. | |
| 4,909,581 A | 3/1990 | Haheeb | |
| 4,938,625 A | 7/1990 | Matsui | |
| 4,944,416 A | 7/1990 | Petersen et al. | |
| 4,961,295 A | 10/1990 | Kosch, Sr. et al. | |
| 5,004,116 A | 4/1991 | Cattarozzi | |
| 5,018,323 A | 5/1991 | Clausen | |
| 5,109,993 A | 5/1992 | Hutchison | |
| 5,114,265 A | 5/1992 | Grisley | |
| 5,121,578 A | 6/1992 | Holz | |
| 5,125,518 A | 6/1992 | Ward | |
| 5,138,803 A | 8/1992 | Grossen | |
| 5,209,556 A | 5/1993 | Anderson | |
| 5,212,925 A | 5/1993 | McClinton | |
| 5,299,509 A | 4/1994 | Ballard | |
| 5,360,121 A | 11/1994 | Sothman | |
| 5,375,802 A | 12/1994 | Branham, II | |
| 5,423,155 A | 6/1995 | Bauer | |
| 5,451,102 A | 9/1995 | Chuan | |
| 5,458,433 A | 10/1995 | Stastny | |
| 5,471,804 A | 12/1995 | Winter, IV | |
| 5,475,960 A | 12/1995 | Lindal | |
| 5,499,667 A | 3/1996 | Nakanishi | |
| 5,499,886 A | 3/1996 | Short et al. | |
| 5,507,331 A | 4/1996 | Nakanishi | |
| 5,527,103 A | 6/1996 | Pittman | |
| 5,536,108 A | 7/1996 | Kvalheim | |
| 5,658,086 A | 8/1997 | Brokaw et al. | |
| 5,711,115 A | 1/1998 | Wirt | |
| 5,775,521 A | 7/1998 | Tisbo | |
| 5,810,505 A | 9/1998 | Henriott | |
| 5,882,098 A | 3/1999 | Brown et al. | |
| 5,893,617 A | 4/1999 | Lee | |
| 5,941,026 A | 8/1999 | Eisenreich | |
| 5,944,294 A | 8/1999 | Baer | |
| 5,950,389 A | 9/1999 | Porter | |
| 6,045,290 A | 4/2000 | Nocievski | |
| 6,050,426 A | 4/2000 | Leurdijk | |
| 6,142,436 A | 11/2000 | Thurston et al. | |
| 6,312,186 B1 | 11/2001 | Röck et al. | |
| 6,349,507 B1 | 2/2002 | Muellerleile | |
| 6,363,645 B1 | 4/2002 | Hunter | |
| 6,413,007 B1 | 7/2002 | Lambright | |
| 6,418,683 B1 | 7/2002 | Martensson | |
| 6,491,172 B2 | 12/2002 | Chance | |
| 6,505,452 B1 | 1/2003 | Hannig | |
| 6,547,086 B1 | 4/2003 | Harvey | |
| 6,578,498 B1 | 6/2003 | Draudt et al. | |
| 6,675,979 B2 | 1/2004 | Taylor | |
| D486,676 S | 2/2004 | Campbell et al. | |
| 6,769,219 B2 | 8/2004 | Schwitte et al. | |
| 6,772,890 B2 | 8/2004 | Campbell et al. | |
| 6,827,028 B1 | 12/2004 | Callaway | |
| 6,971,614 B2 | 12/2005 | Fischer et al. | |
| 7,127,860 B2 | 10/2006 | Pervan | |
| 7,223,045 B2 | 5/2007 | Migli | |
| 7,228,977 B2 | 6/2007 | Perkins et al. | |
| 7,300,120 B2 | 11/2007 | Shin | |
| 7,451,535 B2 | 11/2008 | Wells et al. | |
| 7,451,578 B2 | 11/2008 | Hannig | |
| 7,484,337 B2 * | 2/2009 | Hecht | E04F 15/181 52/592.1 |
| 7,584,583 B2 | 9/2009 | Bergelin et al. | |
| 7,614,350 B2 | 11/2009 | Tuttle et al. | |
| 7,621,092 B2 | 11/2009 | Groeke et al. | |
| 7,634,884 B2 * | 12/2009 | Pervan | E04F 13/0894 52/391 |
| 7,641,414 B1 | 1/2010 | Joyce | |
| 7,717,278 B2 | 5/2010 | Kao | |
| 7,721,503 B2 | 5/2010 | Pervan et al. | |
| 7,793,450 B2 | 9/2010 | Chasmer et al. | |
| 7,818,939 B2 | 10/2010 | Bearinger | |

(56) References Cited

U.S. PATENT DOCUMENTS

| | | | |
|---|---|---|---|
| 7,841,145 B2 * | 11/2010 | Pervan | E04F 15/02038 52/391 |
| 7,854,100 B2 * | 12/2010 | Pervan | B44C 5/0492 52/177 |
| 7,998,549 B2 | 8/2011 | Susnjara | |
| 8,033,074 B2 | 10/2011 | Pervan | |
| 8,038,363 B2 | 10/2011 | Hannig | |
| 8,042,311 B2 | 10/2011 | Pervan | |
| 8,146,754 B2 | 4/2012 | Apgood | |
| 8,220,217 B2 | 7/2012 | Muehlebach | |
| 8,234,830 B2 | 8/2012 | Pervan | |
| 8,341,915 B2 * | 1/2013 | Pervan | E04F 15/02038 52/396.04 |
| 8,365,499 B2 | 2/2013 | Nilsson et al. | |
| 8,387,327 B2 | 3/2013 | Pervan | |
| 8,431,054 B2 * | 4/2013 | Pervan | B30B 15/062 264/109 |
| 8,464,408 B2 | 6/2013 | Hazzard | |
| 8,464,489 B2 * | 6/2013 | Pervan | B44C 1/28 52/592.1 |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 | 12/2013 | Boo | |
| 8,602,227 B1 | 12/2013 | McDonald | |
| 8,615,952 B2 | 12/2013 | Engström | |
| 8,713,886 B2 | 5/2014 | Pervan | |
| 8,745,952 B2 | 6/2014 | Perra | |
| 8,764,137 B2 | 7/2014 | Fehre | |
| 8,776,473 B2 | 7/2014 | Pervan | |
| 8,833,028 B2 | 9/2014 | Whispell et al. | |
| 8,864,407 B1 | 10/2014 | Sorum | |
| 8,869,485 B2 * | 10/2014 | Pervan | E04F 15/02038 52/592.1 |
| 8,882,416 B2 | 11/2014 | Baur et al. | |
| 8,887,468 B2 | 11/2014 | Håkansson et al. | |
| 8,925,274 B2 * | 1/2015 | Darko | E04F 15/02 52/391 |
| 9,175,703 B2 | 11/2015 | Maertens | |
| 9,216,541 B2 | 12/2015 | Boo | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,700,157 B2 | 7/2017 | Keyvanloo | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 | 8/2017 | Hannig | |
| 9,758,973 B2 | 9/2017 | Segaert | |
| 9,763,528 B2 | 9/2017 | Lung | |
| 9,809,983 B2 | 11/2017 | Trudel | |
| 9,945,121 B2 | 4/2018 | Derelöv | |
| 10,017,948 B2 * | 7/2018 | Boo | E04F 15/102 |
| 10,034,541 B2 | 7/2018 | Boo et al. | |
| 10,202,996 B2 | 2/2019 | Håkansson et al. | |
| 10,378,570 B2 | 8/2019 | Broughton | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,933,592 B2 * | 3/2021 | Blomgren | F16B 12/26 |
| 10,953,566 B2 * | 3/2021 | Fransson | B25B 27/02 |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 11,331,824 B2 * | 5/2022 | Myllykangas | B27G 13/08 |
| 11,421,426 B2 * | 8/2022 | Boo | E04F 15/02038 |
| 11,441,590 B2 * | 9/2022 | Derelöv | F16B 5/0012 |
| 11,479,970 B2 * | 10/2022 | Pervan | B27M 3/04 |
| 11,480,204 B2 * | 10/2022 | Derelöv | F16B 12/125 |
| 11,536,307 B2 * | 12/2022 | Derelöv | F16B 12/26 |
| 2002/0170258 A1 | 11/2002 | Schwitte et al. | |
| 2004/0165946 A1 | 8/2004 | Areh et al. | |
| 2005/0042027 A1 | 2/2005 | Migli | |
| 2005/0104483 A1 | 5/2005 | Saravis | |
| 2005/0236544 A1 | 10/2005 | Mancino | |
| 2005/0247653 A1 | 11/2005 | Brooks | |
| 2006/0091093 A1 | 5/2006 | Armari | |
| 2006/0101769 A1 | 5/2006 | Pervan et al. | |
| 2006/0180561 A1 | 8/2006 | Wisnoski et al. | |
| 2006/0236642 A1 | 10/2006 | Pervan | |
| 2006/0273085 A1 | 12/2006 | Casto | |
| 2007/0006543 A1 | 1/2007 | Engström | |
| 2007/0028547 A1 | 2/2007 | Grafenauer et al. | |
| 2007/0193178 A1 | 8/2007 | Groeke et al. | |
| 2008/0010937 A1 | 1/2008 | Pervan et al. | |
| 2008/0066415 A1 | 3/2008 | Pervan | |
| 2008/0193209 A1 | 8/2008 | Henderson | |
| 2008/0216435 A1 | 9/2008 | Nolan | |
| 2008/0236088 A1 | 10/2008 | Hannig et al. | |
| 2008/0244882 A1 | 10/2008 | Woxman et al. | |
| 2009/0014401 A1 | 1/2009 | Tallman | |
| 2009/0064624 A1 | 3/2009 | Sokol | |
| 2010/0028592 A1 | 2/2010 | Barkdoll et al. | |
| 2010/0083603 A1 | 4/2010 | Goodwin | |
| 2010/0104354 A1 | 4/2010 | Spalding | |
| 2010/0173122 A1 | 7/2010 | Susnjara | |
| 2010/0289389 A1 | 11/2010 | Crabtree, II | |
| 2011/0023303 A1 | 2/2011 | Pervan et al. | |
| 2011/0167750 A1 * | 7/2011 | Pervan | E04F 15/02038 52/582.2 |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 * | 1/2013 | Pervan | E04F 15/107 52/582.2 |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2013/0287484 A1 | 10/2013 | Phillips | |
| 2014/0013919 A1 | 1/2014 | Gerke et al. | |
| 2014/0055018 A1 | 2/2014 | Shein et al. | |
| 2014/0111076 A1 | 4/2014 | Devos | |
| 2014/0286701 A1 | 9/2014 | Sauer | |
| 2014/0294498 A1 | 10/2014 | Logan | |
| 2015/0034522 A1 | 2/2015 | Itou et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |

(56) References Cited

U.S. PATENT DOCUMENTS

| | | |
|---|---|---|
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |
| 2022/0049735 A1 | 2/2022 | Meijer |
| 2022/0298803 A1* | 9/2022 | Boo ................ E04F 15/02038 |

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CN | 101099618 A | 1/2008 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 20 2014 100 090 U1 | 11/2014 |
| DE | 10 2015 103 429 A1 | 10/2015 |
| DE | 10 2014 110 124 A1 | 1/2016 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A | 4/2006 |
| EP | 1 671 562 A1 | 6/2006 |
| EP | 1 863 984 A | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2008/004960 A2 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |

(56) References Cited

FOREIGN PATENT DOCUMENTS

| WO | WO 2013/118075 A1 | 8/2013 |
|----|-------------------|--------|
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |

OTHER PUBLICATIONS

U.S. Appl. No. 17/588,698, Caroline Låndgard, Marcus Ståhl and Darko Pervan, filed Jan. 31, 2022.
International Search Report/Written Opinion dated Sep. 15, 2015 in PCT/SE2015/050518, ISA/SE, Patent-och registreringsverket, Stockholm, SE, 11 pages.
Extended European Search Report issued in EP Application No. 15788871.0, dated Feb. 7, 2018, European Patent Office, Munich, DE, 10 pages.
Extended European Search Report issued in EP 21161911.9, dated May 6, 2021, European Patent Office, Munich, DE, 10 pages.
Landgård, Caroline, et al., U.S. Appl. No. 17/588,698, entitled "Building Panels Comprising a Locking Device," filed Jan. 31, 2022.

\* cited by examiner

KNOWN TECHNOLOGY

KNOWN TECHNOLOGY

KNOWN TECHNOLOGY

KNOWN TECHNOLOGY

MECHANICAL LOCKING SYSTEM FOR BUILDING PANELS

CROSS REFERENCE TO RELATED APPLICATIONS

The present application is a continuation of U.S. application Ser. No. 16/946,047, filed on Jun. 4, 2020, which is a continuation of U.S. application Ser. No. 15/308,872, filed on Nov. 4, 2016, now U.S. Pat. No. 10,846,562, which is a U.S. National Stage of International Application No. PCT/SE2015/050518, filed on May 8, 2015, which claims the benefit of Swedish Application No. 1400231-5, filed on May 9, 2014. The entire contents of each of U.S. application Ser. No. 16/946,047, U.S. application Ser. No. 15/308,872, International Application No. PCT/SE2015/050518, and Swedish Application No. 1400231-5 are hereby incorporated herein by reference in their entirety.

TECHNICAL FIELD

The disclosure relates to the field of mechanical locking systems for building panels, especially furniture components with mechanical locking systems, which are intended to lock perpendicularly or in parallel to each other.

FIELD OF APPLICATION

Embodiments of the present invention are particularly suitable for use in furniture components, which are preferably formed of sheet shaped panels and which are joined mechanically with a locking system integrated with the panel, i.e. mounted at the factory, The following description of known technology, problems of known systems and objects and features of the invention will therefore, as a non-restrictive example, be aimed above all at this field of application and in particular at furniture components formed as rectangular or square panels intended to be mechanically joined on one pair of opposite edges perpendicularly or parallel to other adjacent panels.

It should be emphasised that the invention can be applied to any type of sheet shaped panel such as for example wood based HDF, particle board and plywood, plastic sheet shaped materials, mineral fibre and metal based materials, stone and ceramics and similar.

It may be used to assemble and disassemble furniture components, floor panels and elements for packaging boxes and similar. It may also be used to lock and unlock components, which for example have a cylinder form such as table legs.

BACKGROUND

Furniture such as kitchen cabinets, bookshelves, drawers, tables and similar are generally supplied as flat components in order to save transportation costs. The customer must assemble them. Several methods are used to assemble such furniture components for example glue, spikes, screws and similar. Snapping connections comprising plastic components are widely used to connect for example drawers. It is an advantage if assembled furniture components may be disassembled partly or completely again in a simple way. Mistakes during assembly may be corrected and furniture may be dissembled again to flat components in connection with transportation from one apartment to another. A simple and easy disassembly is an advantage even in the case when furniture components are factory assembled.

KNOWN TECHNOLOGY AND PROBLEMS THEREOF

It is known from WO 2012/154113 that furniture components may be locked mechanically with a perpendicular snap action. FIG. 1a shows a first 1 and a second 2 panel. The first panel 1 comprises a groove 6, formed in the panel core 7. An insertion groove 4 formed in one of the groove walls comprises a flexible tongue 3 that locks into a tongue groove 5 when an edge of the second panel 2 is displaced into the groove 6. FIG. 1b shows a known flexible bristle tongue 3, which is used to connect floor panels. Such a tongue is also used to connect furniture components. The tongue 3 comprises flexible protrusions 8 that bend in the length direction of the tongue and that displace the tongue in the insertion groove 4 during the snap action. FIG. 1b shows the tongue 3 in the outer locked position.

FIGS. 1c and 1d show that the locking system may be disassembled. A rod shaped stick 9 is inserted into the tongue groove 3 sideways. The flexible tongue 3 is pushed back into the insertion groove 4 and the second panel 2 may be released from the first panel 1.

The main problem with such disassembly is that the rod shaped stick 9 must be turned in a correct position and must be inserted precisely into the tongue groove 5. A disassembly is not possible if the rod shaped stick is inserted into the insertion groove 4.

SUMMARY

A basic objective of embodiments of the present invention is to simplify disassembly of panels that are locked perpendicularly to each other with a flexible tongue.

The above objects of embodiments of the invention are achieved wholly or partly by a mechanical locking system and panels, according to the independent claims that provide a stronger and easier locking and unlocking. Embodiments of the invention are evident from the dependent claims and from the description and drawings.

A first aspect of the invention is a set of panels comprising a first and a second panel. A panel edge of the second panel is insertable into a core groove of the first panel to obtain a mechanical connection between the first and the second panel. The panel edge is insertable into the core groove by an essentially linear relative displacement of the first and second panel when the first and second panel are arranged essentially perpendicularly to each other. The panel edge comprising a separate and flexible tongue and the core groove comprising a tongue groove, or the panel edge comprising a tongue groove and the core groove comprising a separate and flexible tongue. The separate and flexible tongue is insertable into the tongue groove for connecting the panels to each other in a first direction, which is perpendicular to a main plane (MP-1) of the first panel. The panel edge of the second panel is configured to cooperate with the core groove of the first panel for connecting the panels to each other in a second direction, which is perpendicular to a main plane (MP-2) of the second panel. A longitudinal direction of the separate and flexible tongue extends parallel with the panel edge and/or core groove. The separate and flexible tongue is arranged in an insertion groove and the separate and flexible tongue being displaceable inwardly towards a bottom of the insertion grove and outwardly into the tongue groove during a locking of the first and second panel. The separate and flexible tongue comprises a guiding protrusion at a short edge of the separate and flexible tongue and the guiding protrusion is configured such that its shape changes during the locking and/or unlocking of the first and second panel.

By means of the inventive concept, the panels may be disassembled in an improved and simple manner.

Preferably, the panels in the set of panels are essentially formed as parallelepipeds or, more specifically, as rectangular parallelepipeds.

Each of the panels, in particular the first and the second panel, may comprise a lower side and an upper side. Preferably, the lower and upper sides are shaped as rectangles or squares and are planar. The lower side and the upper side may be parallel. In one example, the panel has a uniform thickness. In another example, the panel has a non-uniform thickness. In yet another example, the panel comprises two or more sections, each having a uniform thickness. The lower side and the upper side of the panel may be parallel with the main plane of the panel. In particular, the main plane of the panel may coincide with the lower or the upper side of the panel. Moreover, each panel may comprise side edges which may connect the upper and lower sides. In the case of a panel formed as a parallelepiped, there may be two pairs of side edges. Preferably, at least portions of the two side edges in each pair of side edges are parallel.

In one example, a density of the panel is uniform. In another example, the density of the panel is higher closer to the upper and/or lower sides than in a center part of the panel.

The first direction may be parallel to the main plane of the second panel. Moreover, the second direction may be parallel to the main plane of the first panel.

The panel edge of a panel may comprise at least a portion of a side edge of the panel. Additionally, the panel edge may comprise a portion of the lower side and a portion of the upper side of the panel close to the side edge. A shape of the panel edge may substantially correspond to a shape of the core groove. Thereby, the second panel may engage with the first panel in a tightly fit manner. In particular, the panel edge and the core groove may be essentially U-shaped. Optionally, corners of the panel edge and/or the core groove may be bevelled.

By a short edge of the separate and flexible tongue is here meant an edge of the tongue in a longitudinal direction of the separate and flexible tongue.

The separate and flexible tongue may comprise an outer edge part that is formed as a guiding protrusion.

The guiding protrusion may be in contact with an inner part of the insertion groove during the locking.

In particular, in a locked position of the first and the second panel, the guiding protrusion may be in contact with the inner part of the insertion groove.

Alternatively, there may be a space between the inner part of the insertion groove and the guiding protrusion in a locked position of the first and the second panel. The space is preferably smaller than the displacement of the separate and flexible tongue during locking along a direction towards the inner part of the insertion groove.

The guiding protrusion may be curve shaped and configured to guide a rod shaped tool into the tongue groove when the rod shaped tool is inserted into the insertion groove. By curve shaped is here meant that at least a portion of the guiding protrusion is shaped as a curve. The curve may have a non-zero curvature. In particular, as seen from a top view, an outer side of the guiding protrusion may be shaped as a curve. The curvature is preferably such that an angle formed between a tangential direction of the outer side of the guiding protrusion and a longitudinal direction of the rod shaped tool is acute. In particular, the angle may be between 1° and 89°. Since the guiding protrusion is curve shaped, the acute angle may vary along the guiding protrusion in a direction towards a tip of the guiding protrusion. For example, the acute angle may increase towards the tip of the guiding protrusion.

According to an alternative embodiment, the guiding protrusion comprises at least one straight portion. As seen from a top view, each straight portion may be inclined with respect to a longitudinal direction of the tongue. In one example, the guiding protrusion comprises one straight portion. In another example, the guiding protrusion comprises at least two straight portions. In the latter example, the straight portions are preferably juxtaposed. The angle with respect to the longitudinal direction of the tongue may be different between the different straight portions. For example, the angle may increase by each straight portion towards the tip of the guiding protrusion.

In one example, a cross section of the guiding protrusion along a direction towards the tip of the guiding protrusion is constant. In another example, the cross section of the guiding protrusion is tapering. Moreover, in non-limiting examples, the cross section of the guiding protrusion along a direction towards its tip may be shaped as a circle, an oval, a polygon, a rectangle, a square, or a triangle.

The guiding protrusion may be flexible. More generally, at least portions of the guiding protrusion may be flexible.

The rod shaped tool may comprise an essentially round cross section. In particular, the cross-section may be shaped as a circle or an oval. By having a rotationally symmetric cross-section, such as a circle, the precise orientation of the rod shaped tool when inserting it into the insertion groove may become immaterial, which may further simplify the disassembly of the panels.

The separate and flexible tongue may comprise several flexible protrusions extending in the length direction of the tongue.

The insertion groove may be formed in the core groove of the first panel.

When the panel edge comprises the tongue groove and the core groove comprises the separate and flexible tongue, the tongue groove may be arranged in the lower side or in the upper side of the second panel. In particular, the tongue groove may be arranged in the lower side or in the upper side of the second panel, close to a side edge of the second panel.

Moreover, when the panel edge comprises the tongue groove and the core groove comprises the separate and flexible tongue, the insertion groove may be formed in the core groove. The core groove may comprise two side walls and a bottom wall. The two side walls of the core groove may be parallel. According to one embodiment, the insertion groove may be arranged in a side wall of the core groove. A shape of at least a part of the flexible tongue may substantially correspond to a shape of the insertion groove. In particular, the flexible tongue and the insertion groove may be essentially U-shaped. The insertion groove may comprise two side walls and a bottom wall. The side walls of the insertion groove may be parallel. In a first example, the bottom wall of the insertion groove is planar. In a second example, the bottom wall of the insertion groove is rounded. The insertion groove may be inclined with respect to the lower side and/or the upper side of the first panel. In a non-limiting example, the angle between a side wall of the insertion groove and the lower side and/or the upper side of the first panel may be between 5° and 45°.

The tongue groove may comprise two side walls and a bottom wall. The side walls of the tongue groove may be parallel. In a first example, the bottom wall of the tongue groove is planar. In a second example, the bottom wall of the tongue groove is rounded. The tongue groove may be inclined with respect to the lower side and/or the upper side of the second panel. In a non-limiting example, the angle between a side wall of the tongue groove and the lower side and/or the upper side of the second panel may be between 45° and 85°. The inclination of the tongue groove may correspond to an inclination of the insertion groove so that in a connected state of the first and second panel, parallel side walls of the tongue groove and parallel side walls of the insertion groove are essentially aligned with each other.

A second aspect of the invention is a locking system for locking of panels comprising a first and a second panel. A panel edge of the second panel is insertable into a core groove of the first panel to obtain a mechanical connection between the first and the second panel. The panel edge is insertable into the core groove by an essentially linear relative displacement of the first and second panel when the first and second panel are arranged essentially perpendicularly to each other. The locking system comprises a separate and flexible tongue arranged in an insertion groove which is formed in the core groove and a tongue groove at the panel edge. The tongue groove is adapted to accommodate a part of the separate and flexible tongue. The separate and flexible tongue comprises a guiding protrusion at a short edge of the separate and flexible tongue. The guiding protrusion is configured such that its shape changes when a rod shaped tool is inserted into at least a part of the tongue groove.

The rod shaped tool may comprise an essentially round cross section.

The invention provides the advantages that a rod shaped tool may be inserted sideways into the insertion groove that generally is larger than the tongue groove and the tool will be automatically guided by the guiding protrusion into the tongue groove. The rod shaped tool may have a simple round cross section and a precise orientation of the tool during insertion into the groove may be avoided. This facilitates an easy and simple disassembly of locked panels.

According to a third aspect of the invention, there is provided a set of panels comprising a first and a second panel. A panel edge of the second panel is insertable into a core groove of the first panel to obtain a mechanical connection between the first and the second panel, the panel edge being insertable into the core groove by an essentially linear relative displacement of the first and second panel when the first and second panel are arranged essentially perpendicularly to each other. Moreover, the panel edge comprises a separate and flexible tongue and the core groove comprises a tongue groove, wherein the separate and flexible tongue is insertable into the tongue groove for connecting the panels to each other in a first direction, which is perpendicular to a main plane of the first panel. The panel edge of the second panel is configured to cooperate with the core groove of the first panel for connecting the panels to each other in a second direction, which is perpendicular to a main plane of the second panel. A longitudinal direction of the separate and flexible tongue extends parallel with the panel edge and/or core groove. The separate and flexible tongue is arranged in an insertion groove and is displaceable inwardly towards a bottom of the insertion groove and outwardly into the tongue groove during a locking of the first and second panel. An engagement portion of the core groove is arranged to engage with the separate and flexible tongue during locking of the first and second panel for displacing the separate and flexible tongue inwardly towards the bottom of the insertion groove, wherein the engagement portion is bevelled.

The bevelled engagement portion may be an upper bevelled engagement portion, provided close to, or at, an upper or lower side of the second panel.

The bevelled engagement portion may be provided in an upper part of the first panel, the upper part having a higher density than a center part of the first panel.

The bevelled engagement portion may be provided between a side wall of the core groove and a lower or upper side of the first panel. In particular, the bevelled engagement portion may join the side wall of the core groove and the upper or lower side of the first panel.

The second panel may comprise an overlapping portion, which engages with the bevelled engagement portion in a locked position of the first and second panel.

A thickness of the second panel may be smaller at the panel edge than in a visible part of the second panel which is visible in a locked position of the first and the second panel.

A distance between a lower edge side and a parallel upper edge side of the panel edge may be smaller than a distance between a lower side and a parallel upper side, the lower and upper edge sides being located closer to a side edge of the second panel than the lower and upper sides.

The insertion groove may be provided in the lower edge side or in the upper edge side of the panel edge. Alternatively, the insertion groove may be provided in the lower side or in the upper side of the second panel.

According to a fourth aspect of the invention, there is provided a set of panels comprising a first and a second panel. A panel edge of the second panel is insertable into a core groove of the first panel to obtain a mechanical connection between the first and the second panel, and the panel edge is insertable into the core groove by an essentially linear relative displacement of the first and second panel when the first and second panel are arranged essentially in the same plane MP-1. Moreover, the panel edge comprises a separate and flexible tongue and the core groove comprises a tongue groove, or the panel edge comprises a tongue groove and the core groove comprises a separate and flexible tongue. The separate and flexible tongue is insertable into the tongue groove for connecting the panels to each other in a first direction, which is parallel to a main plane of the first panel. The panel edge of the second panel is configured to cooperate with the core groove of the first panel for connecting the panels to each other in a second direction, which is perpendicular to the main plane of the panels. A longitudinal direction of the separate and flexible tongue extends parallel with the panel edge and/or core groove. Moreover, the separate and flexible tongue is arranged in an insertion groove and is displaceable inwardly towards a bottom of the insertion groove and outwardly into the tongue groove during a locking of the first and second panel. The separate and flexible tongue comprises a guiding protrusion at a short edge of the separate and flexible tongue, and the guiding protrusion is configured such that its shape changes during the locking and/or unlocking of the first and second panel.

The guiding protrusion may be further configured to be in contact with an inner part of the insertion groove during the locking.

The guiding protrusion may be curve shaped and configured to guide a rod shaped tool into the tongue groove when the rod shaped tool is inserted into the insertion groove.

The rod shaped tool may comprise an essentially round cross section.

DESCRIPTION OF EMBODIMENTS

Figure 1A:
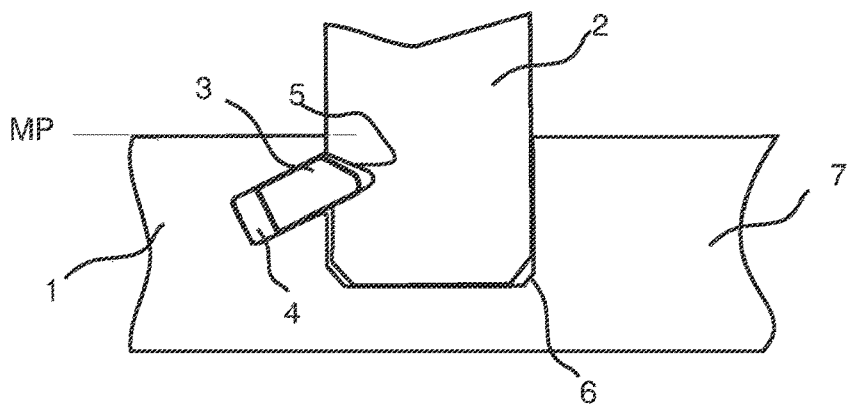
FIGS. 1a-1d illustrate known technology.
Figure 1B:
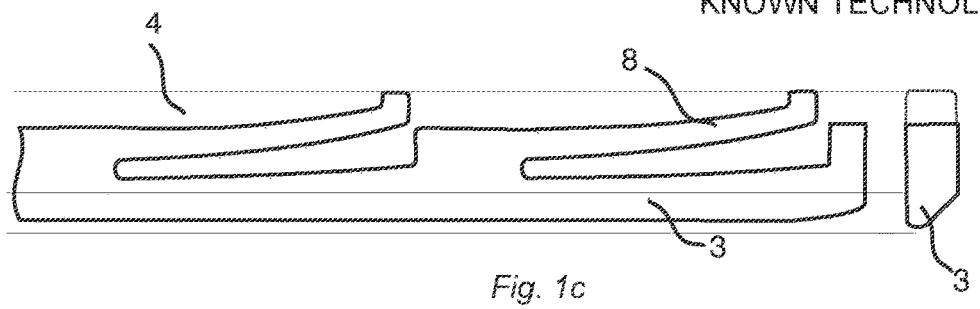
Figure 1C:
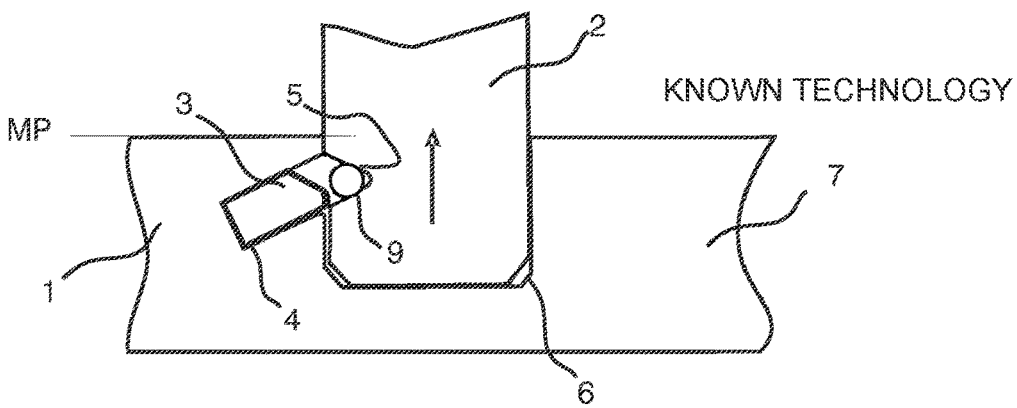
Figure 1D:
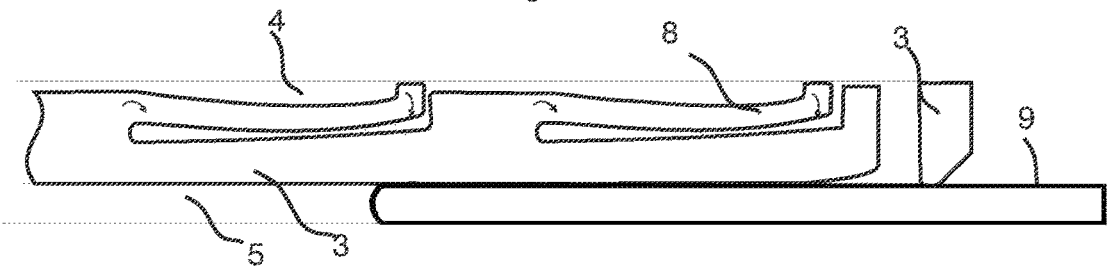

To facilitate understanding, several locking systems in the figures are shown schematically. It should be emphasised that improved or different functions can be achieved using combinations of the preferred embodiments.

FIGS. 2a-d illustrate a first panel 1 and a second panel 2 which are connected to each other in accordance with an embodiment. The first panel 1 comprises a core groove 6 which is arranged in an upper side 1b of the first panel 1. The core groove 6 comprises two opposing side walls 6a, 6b and a bottom wall 6c. The opposing side walls 6a, 6b are parallel. The second panel 2 comprises a panel edge 12 which in a locked position of the panels 1, 2 is arranged in the core groove 6. More specifically, a portion of a lower side 2a, a portion of an upper side 2b, and a side edge 2c of the second panel 2 are arranged in the core groove 6. The panels 1, 2 may be locked to each other by means of a separate and flexible tongue 3.

Figure 2A:
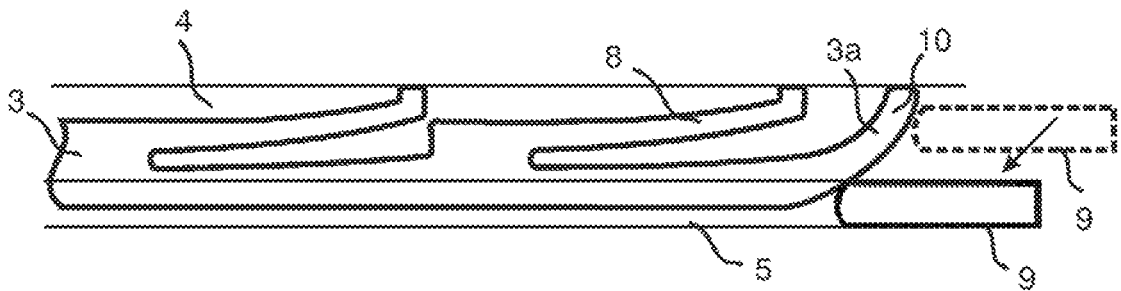
FIGS. 2a-2d illustrate disassembly of locked panels according to an embodiment.

FIG. 2a shows a top view of the flexible tongue 3 in a locked position. A part of the flexible tongue 3 comprising flexible protrusions 8 is located in an insertion groove 4. An opposite part is located in the tongue groove 5 according to known technology. The flexible tongue 3 comprises an outer edge part 3a that is formed as a guiding protrusion 10 that automatically guides a rod shaped tool 9 into a tongue groove 5 when the tool 9 is inserted sideways into the insertion groove 4. The guiding protrusion 10 is arranged at a short edge of the tongue 3. It is understood that there may be a corresponding guiding protrusion 10 arranged at the other short edge of the tongue 3 (not shown).

Figure 2B:
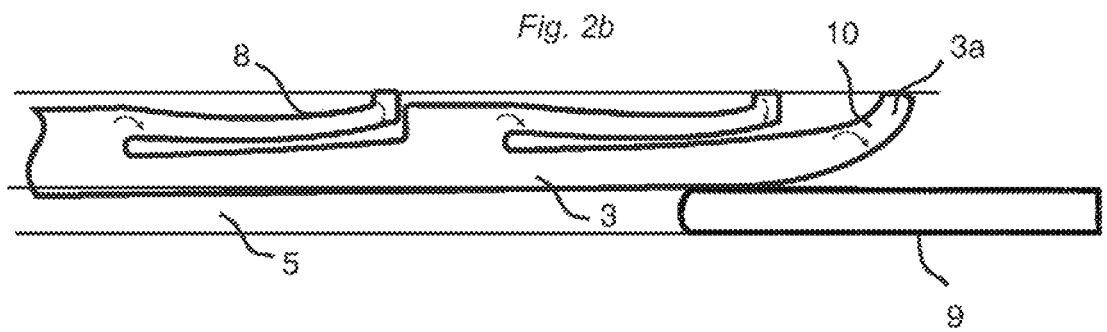

FIG. 2b shows that the flexible guiding protrusion is deformed when the rod shaped tool 9 is displaced sideways parallel to the length direction of the tongue 3 such that the tongue 3 is pressed into the insertion groove 4. It is an advantage if the flexible guiding protrusion 10 is in contact with an inner part of the insertion groove 4 during locking and when the tongue is pressed into the insertion groove. The guiding protrusion 10 is preferably flexible and is preferably also formed as a curved edge part.

Figure 2C:
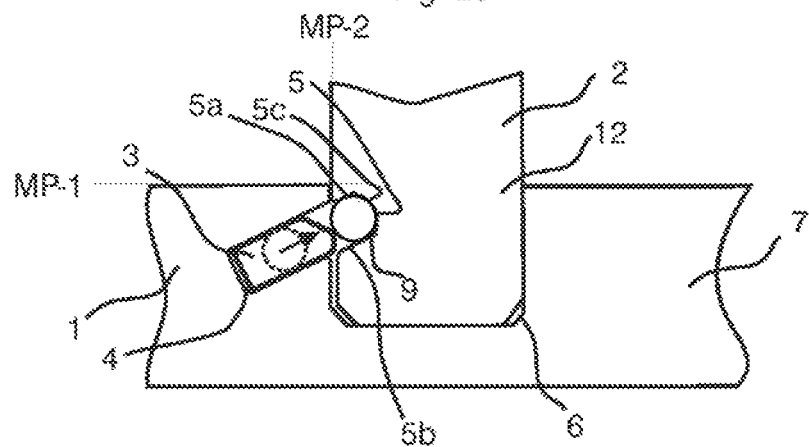

FIG. 2c shows a side view of the locking system. According to the present embodiment, a main plane MP-1 of the first panel 1 coincides with the upper side 1b of the first panel 1. Moreover, a main plane MP-2 of the second panel 2 coincides with the lower side 2a of the first panel 2, which is situated to the left, as shown in FIG. 2c. The rod shaped tool 9 preferably comprises an essentially round cross section. According to the present embodiment, the cross section of the rod shaped tool 9 is circular. Moreover, a width of the rod shaped tool 9 corresponds to a width of the tongue groove 5 between two parallel side walls 5a, 5b thereof.

Figure 2D:
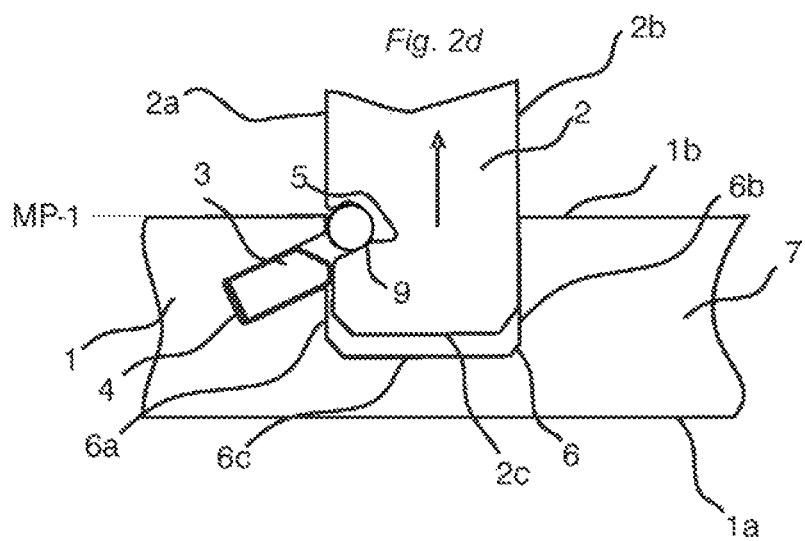

According to the present embodiment, a bottom wall 5c of the tongue groove 5, connecting the two side walls, is rounded. The curvature of the rounded bottom wall 5c substantially corresponds to the curvature of the rod shaped tool 9. Thereby, an improved guiding of the rod shaped tool 9 may be provided. In the present embodiment, the rod shaped tool 9 is adapted to be fitted inside the tongue groove 5 so that essentially no portion of the rod shaped tool 9 extends outside the lower side 2a of the second panel 2. Thereby, the panels 1, 2 may be easily disassembled, since the rod shaped tool 9 may be fitted inside the tongue groove 5 while the tongue 3 is displaced into the insertion groove 4, thereby releasing the mechanical connection between the first 1 and the second panel 2. FIG. 2d shows disassembly of the first 1 and the second panel 2 according to the present embodiment.

It is clear that other shapes of the rod shaped tool 9 and the tongue groove 5 are equally conceivable. For example, the cross-section of the rod shaped tool 9 may be shaped as a polygon, a rectangle, a square, an oval, a triangle or a star. Additionally, according to alternative embodiments, the shape of the bottom wall may not correspond to the shape of the rod shaped tool 9. For example, the cross-section of the rod shaped tool 9 may be circular and the cross-section of the tongue groove 5 may be U-shaped, for example comprising a planar bottom wall.

The insertion groove 4 may also be formed in the second panel 2 and the tongue groove 5 may be formed in the core groove 6 of the first panel 1. This will be described in more detail below.

The above-described embodiment provides the advantages that the insertion of the tool 9 may be made into the whole cross section comprising the insertion groove 4 and the tongue grooves 5. A symmetric tool cross section may be used that eliminates a precise orientation of the tool 9 prior to insertion into the grooves.

The guiding of the rod shaped tool 9 is illustrated in FIG. 2a and FIG. 2c. The broken lines illustrate the position of the rod shaped tool 9 when inserted into the insertion groove 4 and the arrows indicate that the rod shaped tool 9 is guided into the tongue groove 5 in the shown direction.

Figure 3A:
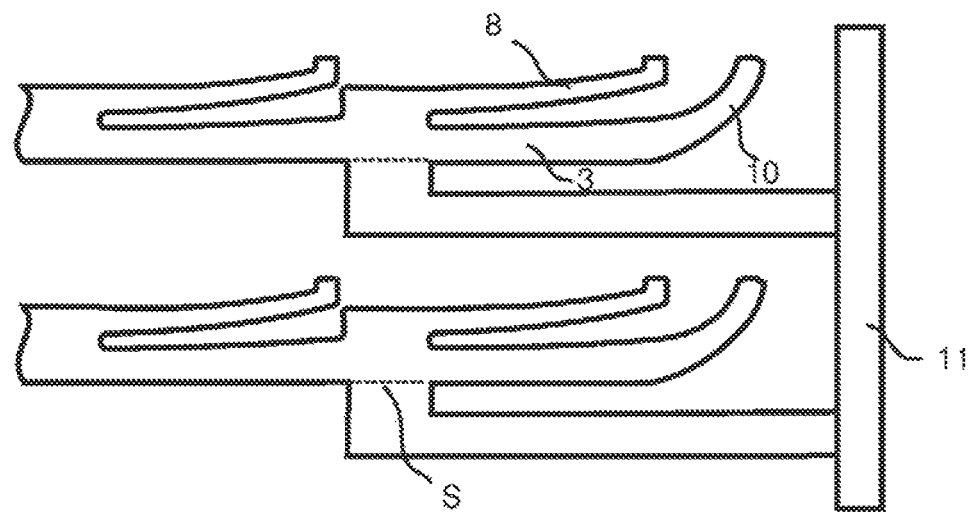
FIGS. 3a-3d illustrate embodiments of separate flexible tongues.

FIG. 3a shows a tongue blank 11 comprising several thermoplastic injection-moulded flexible tongues 3. The tongues are preferably separated from the blank 11 at a separation portion S located inwardly and at a distance from the outer edge of the tongue 3.

Figure 3B:
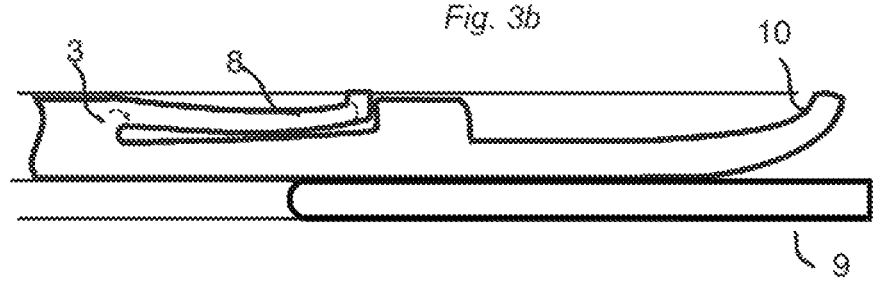

FIG. 3b shows that the guiding protrusion 10 may replace one of the flexible protrusions 8 such that all flexible protrusions 8 are located along the tongue in the length direction of the tongue and spaced in the length direction from the guiding protrusion 10.

Figure 3C:
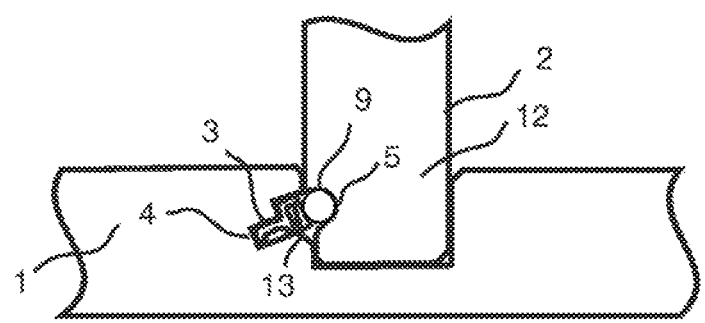

FIG. 3c shows that the principles of the invention may be used to improve disassembly when other types of tongues are used for example flexible tongues comprising a snap tab 13 at the outer part. The locking system comprising a flexible snap tab 13 may be formed such that a tool 9 with an essentially round cross section may be used to release the first 1 and the second 2 panels.

Figure 3D:
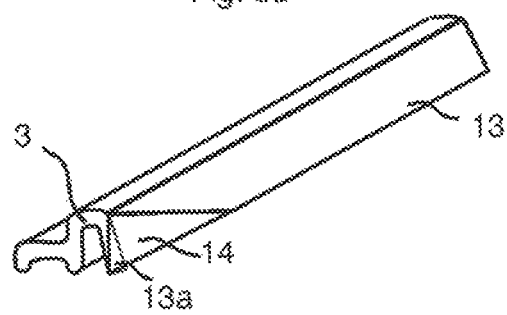

FIG. 3d shows that such tongue 3 comprising a snap tab 13 may comprise a symmetric cross section in inner parts and an edge portion that may be cut or formed to a wedge shaped edge part 14. The flexible tongue may comprise a flexible snap tab and an asymmetric cross section along its length direction.

In particular, the flexible tongue 3 may be tapering towards an edge of the flexible tongue 3 in a longitudinal direction. Thereby, an area of the cross section of the flexible tongue 3 may decrease towards the edge. Additionally, a maximal horizontal distance from an inner part of the cross section to an outer part of the cross section may decrease towards the edge. Here, the horizontal distance is measured in a direction along which the flexible tongue 3 is adapted to contract and expand. For example, the horizontal distance may be measured in a direction along which the flexible snap tab 13 is adapted to contract and expand. As shown in the embodiment according to FIG. 3d, the cross section of the flexible snap tab 13 decreases towards the edge. A portion 13a of the flexible snap tab 13 has been cut out from the flexible tongue 3 for providing the tapering edge.

Figure 4A:
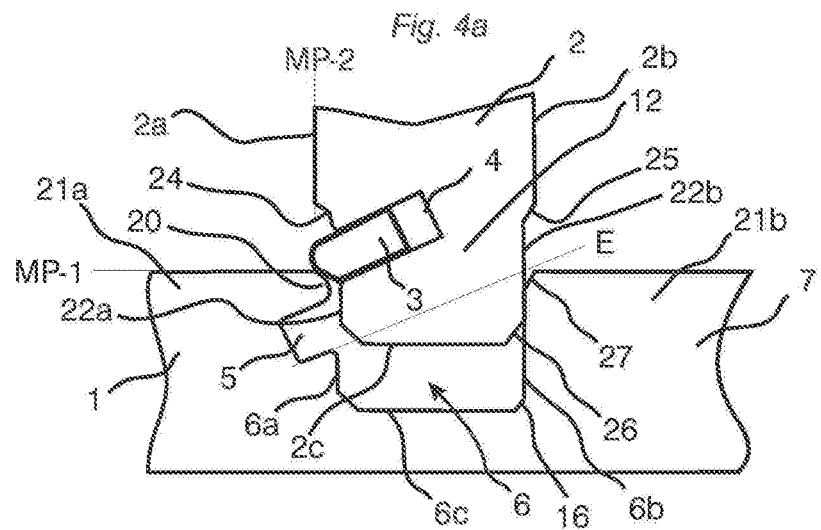
FIGS. 4a-4c illustrate assembly and disassembly of panels according to an alternative embodiment.
Figure 4B:
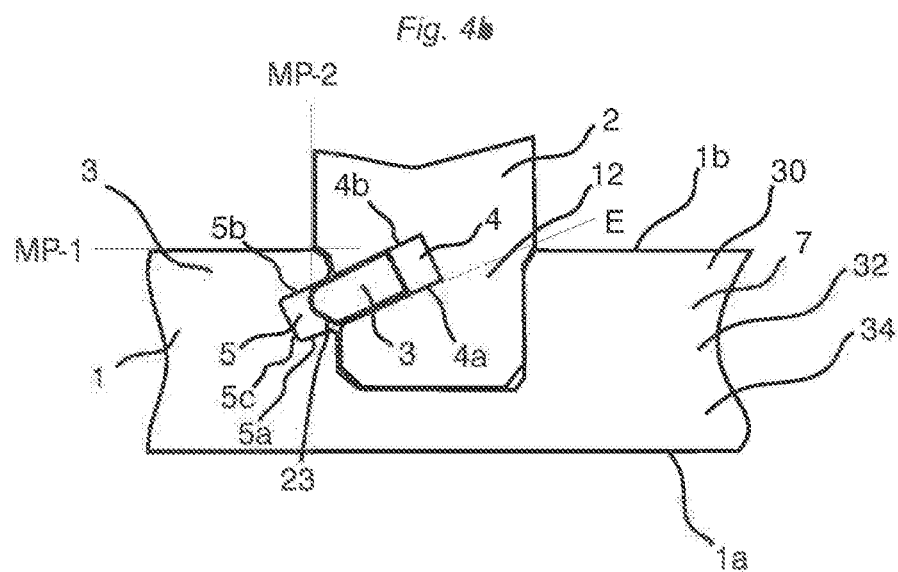

Next, an alternative embodiment will be described with respect to FIGS. 4a-c. FIGS. 4a and 4b show a side view of a first panel 1 and a second panel 2 which are being assembled. It is understood that, in FIGS. 4a-c, the first panel 1 extends horizontally and that the second panel 2 extends vertically and that only a connecting region of the first 1 and second 2 panel is shown. The first 1 and second 2 panels are arranged essentially perpendicularly to each other.

According to the present embodiment, the first panel 1 comprises three parts: an upper part 30, a center part 32, and a lower part 34. The upper part 30 and the lower part 34 are located close to the upper 1b and lower 1a sides, respectively, and have a higher density than the center part 32.

The core groove 6 comprises two opposing side walls 6a, 6b and a bottom wall 6c. The core groove 6 comprises a tongue groove 5. The tongue groove 5 is provided in the side wall 6a of the tongue groove 5. Thus, the tongue groove 5 is provided in a left part 21a of the first panel 1 which is located to the left of core groove 6. Moreover, the tongue groove 5 comprises two parallel side walls 5a, 5b and a bottom wall 5c. As seen from the side view in FIGS. 4a-c, a linear extension E of the lower side wall 5a is located at or above a right part 21b of the first panel 1, which is located to the right of core groove 6. Thereby, a tool, such as a cutting tool, may easily provide the tongue groove 5 by means of a linear displacement of the tool.

An engagement portion 20 of the core groove 6 is bevelled. The bevelled engagement portion 20 is provided between an upper part of the side wall 6a and the upper side 1b of the first panel 1, thereby joining them. Alternatively, the engagement portion 20 of the core groove 6 may be rounded off.

Moreover, the panel edge 12 of the second panel 2 has a smaller thickness than an inner part of the second panel 2, wherein the inner part is located farther from a side edge 2c of the second panel 2 than the panel edge 12. More specifically, the panel edge 12 comprises a lower edge side 22a and an upper side edge 22b which are parallel to each other and are located closer to the side edge 2c of the second panel 2 than a lower side 2a and an upper side 2b of the second panel 2. As displayed in FIG. 4c, the distance $d_1$ between the lower edge side 22a and the upper side edge 22b is smaller than the distance $d_2$ between the lower side 2a and the upper side 2b.

The lower edge side 22a is joined to the lower side 2a by means of an overlapping portion 24. According to the present embodiment, there is a corresponding upper edge side 22b which is joined to the upper side 2b of the second panel 2 by means of an overlapping portion 25. By means of the overlapping portions 24, 25, which in an assembled state, or locked position, of the first 1 and second 2 panels engage with the bevelled engagement portion 20 and a bevelled surface 27 of the core groove 6, respectively, the panel edge 12 and/or the core groove 6 may be concealed in an improved manner.

The panel edge 12 comprises a separate and flexible tongue 3. The separate and flexible tongue 3 may assume a contracted state and an expanded state and has a tendency to assume the expanded state when no forces are acting on it. The separate and flexible tongue 3 is arranged in an insertion groove 4 which is provided in lower edge side 22a of the panel edge 12. The separate and flexible tongue 3 comprises a chamfered portion 23 which is pointing downwards when the separate and flexible tongue 3 is inserted into the insertion groove 4.

When the first 1 and second 2 panels are assembled, the panel edge 12 of the second panel 2 is inserted into the core groove 6 of the first panel 1 by a relative vertical displacement of the first 1 and second 2 panels. The displacement is linear. The separate and flexible tongue 3 is partly inserted into the insertion groove 4 and is further displaced into the insertion groove 4 when the chamfered portion 23 engages with the bevelled engagement portion 20 during the vertical displacement. By means of the bevelled engagement portion 20, the chamfered portion 23 engages with a smooth surface during the assembly. Thereby, the chamfered portion 23 may avoid engaging with any sharp edges during assembly. When displaced further into the insertion groove 4, the separate and flexible tongue 3 may become contracted. When the side walls 4a, 4b of the insertion groove 4 are aligned with the side walls 5a, 5b of the tongue groove 5, the separate and flexible tongue 3 may expand and may be displaced out from the insertion groove 4 and into the tongue groove 5 for obtaining a locking of the first 1 and second 2 panels in a direction which is perpendicular to the main plane MP-1 of the first panel.

The core groove 6 comprises an inclined portion 16 between the side wall 6a and the bottom wall 6c as well as between the side wall 6b and the bottom wall 6c. Moreover, the panel edge 12 comprises a bevel 26 between the lower edge side 22a and the side edge 2c of the second panel 2 and a bevel 26 between the upper edge side 22b and the side edge 2c of the second panel 2. A shape of the inclined portion 16 may substantially correspond to a shape of the bevel 26. For example, the inclination of the inclined portion 16 and the bevel 26 may be substantially the same. The bevels 26 may remove sharp corners between the edge sides 22a, 22b and the side edge 2c. Moreover, the bevels 26 may guide the second panel 2 into a proper locking position.

In a locked position of the panels 1, 2, the panel edge 12 cooperates with the core groove 6 for connecting the panels to each other in a second direction, which is perpendicular to a main plane MP-2 of the second panel 2.

From FIG. 4b it is clear that the visible outer parts of the first 1 and second 2 panels have a uniform thickness in a locked position of the first 1 and second 2 panel.

It is understood that according to an alternative embodiment, the second panel 2 may have a uniform thickness.

Figure 4C:
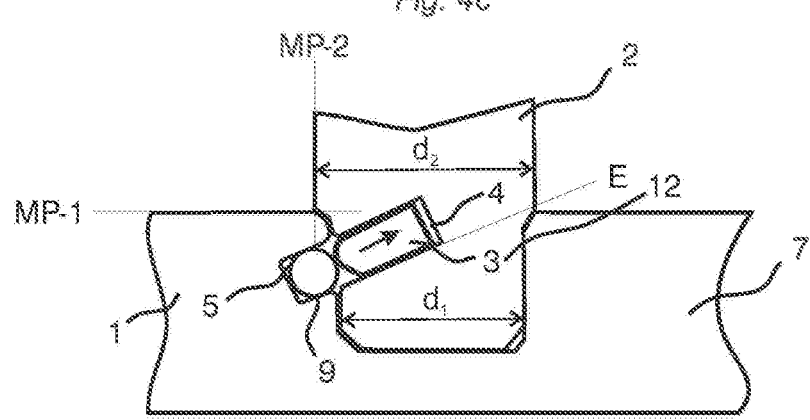

FIG. 4c shows a side view of a first panel 1 and a second panel 2 which are being disassembled. This is analogous to the disassembly described above in relation to FIGS. 2a-d. In particular, when disassembling, the rod shaped tool 9 is inserted sideways into the insertion groove 4 and is guided into a proper position in the tongue groove 5 by means of a guiding protrusion 10 which is provided at a short edge of the separate and flexible tongue 3. When the rod shaped tool 9 is inserted into the tongue groove 5, the separate and flexible tongue 3 is displaced into insertion groove 4. Thereby, the second panel 2 becomes unlocked and the panel edge 12 may be removed from the core groove 6 by a relative linear vertical displacement of the first 1 and second 2 panel.

FIGS. 5a-5d show a locking system that may be used to lock and unlock a first 1 and a second 2 panel that, in a locked position, are located in the same main plane MP-1. In other words, the panels are arranged essentially in parallel with each other. Such a locking system may be used to lock two or several furniture components with, for example, a length of 0.6 m and that after locking form a part of a book shelf with a length of, for example, 1.2 or 1.8 m. An advantage of providing this type of locking system is that smaller components are easier to transport, assemble and disassemble. It is clear than other lengths of the furniture components are equally conceivable. In non-limiting examples, the length may be between 0.1 m and 1.0 m.

In the present embodiment, the first panel 1 and the second panel 2 have a uniform thickness.

The first panel 1 comprises a core groove 6 and a tongue groove 5 and the second panel 2 comprises a panel edge 12 that is insertable into the core groove 6 with a displacement parallel with the main plane MP-1 of the first and the second panel. The panel edge 12 comprises a separate and flexible tongue 3 which is provided in an insertion groove 4. In a locked position of the panels, the separate and flexible tongue 3 locks into the tongue groove 5.

According to an alternative embodiment (not shown), the tongue groove 5 may be provided in the second panel 2 and the separate and flexible tongue 3 may be provided in the first panel 1.

It is essential that the locking system is strong in order to provide sufficient rigidity to the locked components. Preferably, an upper edge 30a and a lower edge 31a of the first panel 1 and an upper edge 31b and a lower edge 31b of the second panel 2 are in contact with each other when the panels 1, 2 are locked.

According to the present embodiment, a side face of the panel edge 12 engages with a bottom wall of the core groove 6 in a locked position of the first 1 and second 2 panel. This may be seen in FIG. 5c. In addition, in a locked position, an upper and a lower face of the panel edge 12 engage with a respective one of two opposing side walls of the core groove 6. According to an alternative embodiment (not shown), however, the side face of the panel edge 12 may be separated from the bottom wall of the core groove 6 in a locked position of the first 1 and second 2 panel.

The first panel 1 comprises an engagement portion 40 which is arranged to engage with the separate and flexible tongue 3 during locking of the first 1 and second 2 panel for displacing the separate and flexible tongue 3 inwardly towards the bottom of the insertion groove 4. The engagement portion 40 is inclined with respect to the main plane MP-1 of the first 1 and second 2 panel. Moreover, the engagement portion 40 is bevelled at a portion 42 which is adjacent to the tongue groove 5.

Figure 5A:
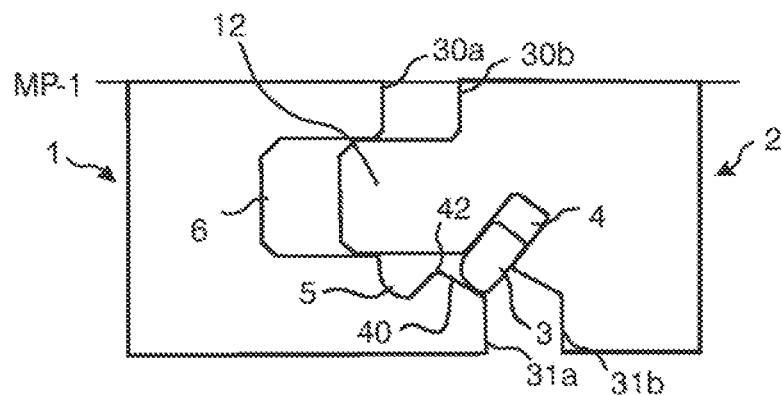
FIGS. 5a-5d illustrate assembly and disassembly of panels located in the same main plane according to an embodiment.
Figure 5B:
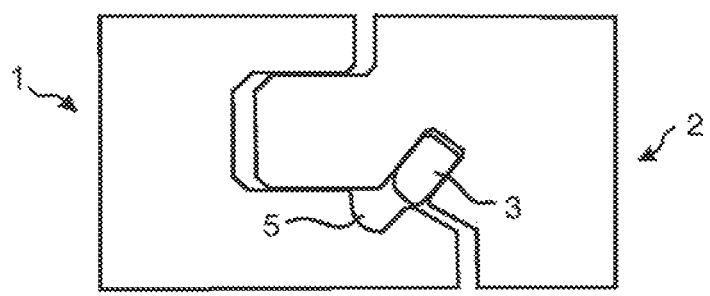
Figure 5C:
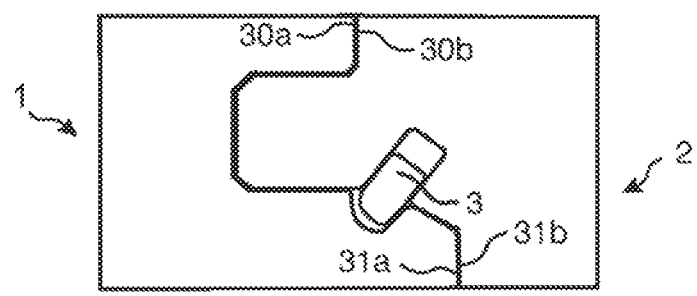
Figure 5D:
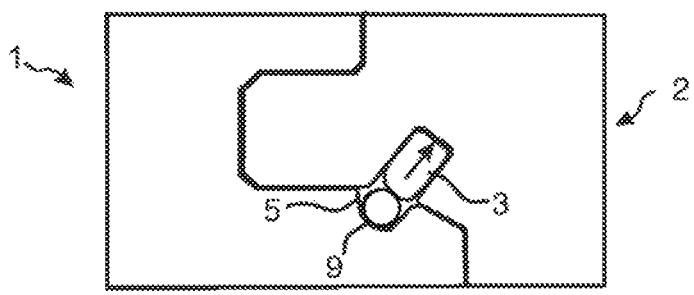

FIG. 5d shows unlocking of the first 1 and second 2 panels with a rod shaped tool 9 according to the above-described methods. The separate and flexible tongue 3 comprises an outer edge part 3a that is formed as a guiding protrusion 10 that automatically guides the rod shaped tool 9 into the tongue groove 5 when the tool 9 is inserted sideways into the insertion groove 4.

EMBODIMENTS

1. A set of panels (1,2) comprising a first (1) and a second panel (2), a panel edge (12) of the second panel (2) being insertable into a core groove (6) of the first panel (1) to obtain a mechanical connection between the first and the second panel, the panel edge (12) being insertable into the core groove (6) by an essentially linear relative displacement of the first and second panel when the first and second panel are arranged essentially perpendicularly to each other, said panel edge (12) comprising a separate and flexible tongue (3) and said core groove (6) comprising a tongue groove (5), or said panel edge (12) comprising a tongue groove (5) and said core groove (6) comprising a separate and flexible tongue (3), wherein the separate and flexible tongue (3) is insertable into the tongue groove (5) for connecting said panels to each other in a first direction, which is perpendicular to a main plane (MP-1) of the first panel, wherein the panel edge (12) of the second panel (2) is configured to cooperate with the core groove (6) of the first panel (1) for connecting said panels to each other in a second direction, which is perpendicular to a main plane (MP-2) of the second panel, wherein a longitudinal direction of the separate and flexible tongue (3) extends parallel with said panel edge and/or core groove, and wherein the separate and flexible tongue (3) is arranged in an insertion groove (4), said separate and flexible tongue (3) being displaceable inwardly towards a bottom of the insertion groove (4) and outwardly into the tongue groove (5) during a locking of the first and second panel, characterized in that the separate and flexible tongue (3) comprises a guiding protrusion (10) at a short edge of the separate and flexible tongue (3), and that the guiding protrusion (10) is configured such that its shape changes during the locking and/or unlocking of the first and second panel.

2. The set of panels as in embodiment 1, wherein the guiding protrusion (10) is further configured to be in contact with an inner part of the insertion groove (4) during the locking.

3. The set of panels as in embodiment 1, wherein there is a space between an inner part of the insertion groove (4) and the guiding protrusion (10) in a locked position of the first (1) and the second (2) panel.

4. The set of panels as in any of the preceding embodiments, wherein the guiding protrusion (10) is curve shaped and configured to guide a rod shaped tool (9) into the tongue groove (5) when the rod shaped tool (9) is inserted into the insertion groove (4).

5. The set of panels as in any of the preceding embodiments, wherein the rod shaped tool (9) comprises an essentially round cross section.

6. The set of panels as in any of the preceding embodiments, wherein the separate and flexible tongue (3) comprises several flexible protrusions (8, 10) extending in the length direction of the tongue (3).

7. The set of panels as in any of the preceding embodiments, wherein, when said panel edge (12) comprises the tongue groove (5) and said core groove (6) comprises the separate and flexible tongue (3), said tongue groove (5) is arranged in a lower side (2a) or in an upper side (2b) of the second panel (2).

8. The set of panels as in any of the preceding embodiments, wherein, when said panel edge (12) comprises the tongue groove (5) and said core groove (6) comprises the separate and flexible tongue (3), said insertion groove (4) is formed in said core groove (6) of the first panel (1).

9. The set of panels according to embodiment 8, wherein said insertion groove (4) is arranged in a side wall (6a) of said core groove (6).

10. A locking system for locking of panels (1, 2) comprising a first (1) and a second panel (2), wherein a panel edge (12) of the second panel (2) is insertable into a core groove (6) of the first panel (1) to obtain a mechanical connection between the first and the second panel, the panel edge (12) being insertable into the core groove (6) by an essentially linear relative displacement of the first and second panel when the first and second panel are arranged essentially perpendicularly to each other, wherein the locking system comprises:
- a separate and flexible tongue (3) arranged in an insertion groove (4) which is formed in the core groove (6); and
- a tongue groove (5) at the panel edge (12), said tongue groove (5) being adapted to accommodate a part of the separate and flexible tongue (3),
- characterized in that the separate and flexible tongue (3) comprises a guiding protrusion (10) at a short edge of the separate and flexible tongue (3), and that the guiding protrusion is configured such that its shape changes when a rod shaped tool (9) is inserted into at least a part of the tongue groove (5).

11. A locking system as in embodiment 10, wherein the rod shaped tool (9) comprises an essentially round cross section.

12. A set of panels (1,2) comprising a first (1) and a second panel (2), a panel edge (12) of the second panel (2) being insertable into a core groove (6) of the first panel (1) to obtain a mechanical connection between the first and the second panel, the panel edge (12) being insertable into the core groove (6) by an essentially linear relative displacement of the first and second panel when the first and second panel are arranged essentially perpendicularly to each other,
- said panel edge (12) comprising a separate and flexible tongue (3) and said core groove (6) comprising a tongue groove (5),
- wherein the separate and flexible tongue (3) is insertable into the tongue groove (5) for connecting said panels to each other in a first direction, which is perpendicular to a main plane (MP-1) of the first panel,
- wherein the panel edge (12) of the second panel (2) is configured to cooperate with the core groove (6) of the first panel (1) for connecting said panels to each other in a second direction, which is perpendicular to a main plane (MP-2) of the second panel,
- wherein a longitudinal direction of the separate and flexible tongue (3) extends parallel with said panel edge and/or core groove, and
- wherein the separate and flexible tongue (3) is arranged in an insertion groove (4), said separate and flexible tongue (3) being displaceable inwardly towards a bottom of the insertion groove (4) and outwardly into the tongue groove (5) during a locking of the first and second panel,
- characterized in that an engagement portion (20) of the core groove (6) is arranged to engage with said separate and flexible tongue (3) during locking of the first and second panel for displacing the separate and flexible tongue (3) inwardly towards the bottom of the insertion groove (4), wherein said engagement portion (20) is bevelled.

13. The set of panels as in embodiment 12, wherein the bevelled engagement portion (20) is provided in an upper part (30) of the first panel (1), said upper part (30) having a higher density than a center part (32) of the first panel (1).

14. The set of panels as in embodiment 12 or 13, wherein the bevelled engagement portion (20) is provided between a side wall (6a) of said core groove (6) and a lower (1a) or upper side (1b) of the first panel (1).

15. The set of panels as in any of embodiments 12 to 14, wherein the second panel (2) comprises an overlapping portion (24), which engages with the bevelled engagement portion (20) in a locked position of the first (1) and second (2) panel.

16. The set of panels as in any of embodiments 12 to 15, wherein a thickness of the second panel (2) is smaller at the panel edge (12) than in a visible part of the second panel (2) which is visible in a locked position of the first (1) and the second (2) panel.

17. The set of panels as in any of embodiments 12 to 16, wherein a distance between a lower edge side (22a) and a parallel upper edge side (22b) of the panel edge (12) is smaller than a distance between a lower side (2a) and a parallel upper side (2b), the lower and upper edge sides (22a, 22b) being located closer to a side edge (2c) of the second panel (2) than the lower and upper sides (2a, 2b).

18. The set of panels as in embodiment 17, wherein the insertion groove (4) is provided in said lower edge side (22a) or in said upper edge side (22b) of the panel edge (12).

19. A set of panels (1,2) comprising a first (1) and a second panel (2), a panel edge (12) of the second panel (2) being insertable into a core groove (6) of the first panel (1) to obtain a mechanical connection between the first and the second panel, the panel edge (12) being insertable into the core groove (6) by an essentially linear relative displacement of the first and second panel when the first and second panel are arranged essentially in the same plane (MP-1)
- said panel edge (12) comprising a separate and flexible tongue (3) and said core groove (6) comprising a tongue groove (5), or said panel edge (12) comprising a tongue groove (5) and said core groove (6) comprising a separate and flexible tongue (3),
- wherein the separate and flexible tongue (3) is insertable into the tongue groove (5) for connecting said panels to each other in a first direction, which is parallel to a main plane (MP-1) of the first panel,
- wherein the panel edge (12) of the second panel (2) is configured to cooperate with the core groove (6) of the first panel (1) for connecting said panels to each other in a second direction, which is perpendicular to the main plane (MP-1) of the panels (1, 2),
- wherein a longitudinal direction of the separate and flexible tongue (3) extends parallel with said panel edge (12) and/or core groove (6), and
- wherein the separate and flexible tongue (3) is arranged in an insertion groove (4), said separate and flexible tongue (3) being displaceable inwardly towards a bottom of the insertion groove (4) and outwardly into the tongue groove (5) during a locking of the first and second panel,
- characterized in that the separate and flexible tongue (3) comprises a guiding protrusion (10) at a short edge of the separate and flexible tongue (3), and that the guiding protrusion (10) is configured such that its shape changes during the locking and/or unlocking of the first and second panel.

20. The set of panels as in embodiment 19, wherein the guiding protrusion (10) is further configured to be in contact with an inner part of the insertion groove (4) during the locking.

21. The set of panels as in any of embodiments 19 to 20, wherein the guiding protrusion (10) is curve shaped and configured to guide a rod shaped tool (9) into the tongue groove (5) when the rod shaped tool (9) is inserted into the insertion groove (4).

22. The set of panels as in any of embodiments 19 to 21, wherein the rod shaped tool (9) comprises an essentially round cross section.

The invention claimed is:

1. A set of panels comprising a first panel and a second panel, a panel edge of the second panel being insertable into a core groove of the first panel to obtain a mechanical connection between the first panel and the second panel,
   said first panel comprising a first main plane and said second panel comprising a second main plane, the panel edge being insertable into the core groove by an essentially linear relative displacement of the first and second panels when the first main plane is essentially parallel to the second main plane,
   said panel edge comprising a separate and flexible tongue and said first panel comprising a tongue groove, wherein the separate and flexible tongue is insertable into the tongue groove for connecting said panels to each other in a first direction, which is parallel to the first main plane,
   wherein the panel edge of the second panel is configured to cooperate with the core groove of the first panel for connecting said panels to each other in a second direction, which is perpendicular to the first main plane,
   wherein a longitudinal direction of the separate and flexible tongue extends parallel with said panel edge and/or core groove, and
   wherein the separate and flexible tongue is arranged in an insertion groove, said separate and flexible tongue being displaceable inwardly towards a bottom of the insertion groove and outwardly into the tongue groove during a locking of the first and second panels,
   wherein the insertion groove is inclined with respect to said second direction.

2. The set of panels according to claim 1, wherein side walls of the insertion groove are parallel to each other and are planar.

3. The set of panels according to claim 1, wherein a side wall of the tongue groove is planar.

4. The set of panels according to claim 1, wherein side walls of the core groove are parallel to each other.

5. The set of panels according to claim 1, wherein the tongue groove is at least partially provided in the core groove.

6. The set of panels according to claim 1, wherein the first panel and the second panel have a uniform thickness.

7. The set of panels according to claim 1, wherein a first upper edge and a first lower edge of the first panel and a second upper edge and a second lower edge of the second panel are respectively in contact with each other when the panels are locked.

8. The set of panels according to claim 1, wherein a side face of the panel edge engages with a bottom wall of the core groove in a locked position of the first and second panels.

9. The set of panels according to claim 1, wherein a side face of the panel edge is separated from a bottom wall of the core groove in a locked position of the first and second panels.

10. The set of panels according to claim 1, wherein the first panel comprises an engagement portion configured to engage with the separate and flexible tongue during locking of the first and second panels for displacing the separate and flexible tongue inwardly towards the bottom of the insertion groove.

11. The set of panels according to claim 10, wherein the engagement portion is inclined with respect to the first main plane of the first panel.

12. The set of panels according to claim 10, wherein the engagement portion is beveled at a portion that is adjacent to the tongue groove.

13. The set of panels according to claim 1, wherein a short edge of the separate and flexible tongue comprises a guiding protrusion.

14. The set of panels according to claim 13, wherein the guiding protrusion is configured such that a shape of the guiding protrusion changes during the locking and/or unlocking of the first and second panels.

15. The set of panels according to claim 13, wherein the guiding protrusion is configured to be in contact with an inner part of the insertion groove during the locking.

16. The set of panels according to claim 13, wherein the guiding protrusion is curve-shaped and configured to guide a rod-shaped tool into the tongue groove when the rod-shaped tool is inserted into the insertion groove.

17. The set of panels according to claim 16, wherein the rod-shaped tool comprises an essentially round cross section.

18. The set of panels according to claim 1, wherein the panels are furniture components.

* * * * *